(12) United States Patent
Song et al.

(10) Patent No.: US 8,119,294 B2
(45) Date of Patent: Feb. 21, 2012

(54) SYSTEM AND METHOD FOR OPERATING A HIGH TEMPERATURE FUEL CELL AS A BACK-UP POWER SUPPLY WITH REDUCED PERFORMANCE DECAY

(75) Inventors: Yang Song, Hillsboro, OR (US); Zakiul Kabir, Hillsboro, OR (US); Craig Evans, Portland, OR (US); Lin Qiu, London (CA); Donald L. Maricle, Glastonbury, CT (US)

(73) Assignee: ClearEdge Power, Inc., Hillsboro, OR (US)

( * ) Notice: Subject to any disclaimer, the term of this patent is extended or adjusted under 35 U.S.C. 154(b) by 1128 days.

(21) Appl. No.: 11/986,271

(22) Filed: Nov. 19, 2007

(65) Prior Publication Data

US 2009/0253000 A1   Oct. 8, 2009

(51) Int. Cl.
*H01M 8/00* (2006.01)
(52) U.S. Cl. ......... 429/400; 429/428; 429/433; 429/477
(58) Field of Classification Search .................. 429/400, 429/428, 433, 477
See application file for complete search history.

(56) References Cited

U.S. PATENT DOCUMENTS

| | | | |
|---|---|---|---|
| 5,045,414 A | 9/1991 | Bushnell et al. | |
| 5,525,436 A | 6/1996 | Savinell et al. | |
| 6,093,500 A | 7/2000 | Margiott et al. | |
| 6,179,986 B1 | 1/2001 | Swette et al. | |
| 6,358,639 B2 | 3/2002 | Oko et al. | |
| 6,393,354 B1 | 5/2002 | Scheffler et al. | |
| 6,514,635 B2 | 2/2003 | Van Dine et al. | |
| 6,519,510 B1 | 2/2003 | Margiott et al. | |
| 6,551,731 B1 | 4/2003 | Berg et al. | |
| 6,605,378 B2 | 8/2003 | Saito et al. | |
| 6,635,370 B2 | 10/2003 | Condit et al. | |
| 6,818,336 B2 | 11/2004 | Isom et al. | |
| 6,936,360 B2 | 8/2005 | Margiott et al. | |
| 7,276,305 B2 | 10/2007 | Fukumoto et al. | |
| 2002/0076582 A1 | 6/2002 | Reiser et al. | |
| 2006/0127708 A1 | 6/2006 | Ping et al. | |
| 2006/0134497 A1 | 6/2006 | Vinsant | |
| 2006/0134503 A1 | 6/2006 | Vinsant | |

(Continued)

OTHER PUBLICATIONS

Reiser, Carl A. et al., "A Reverse-Current Decay Mechanism for Fuel Cells," Journal of the Electrochemical Society, Apr. 15, 2005, A273-A276, 8 (6), The Electrochemical Society, Inc., South Windsor, Connecticut.

(Continued)

*Primary Examiner* — Jane Rhee
(74) *Attorney, Agent, or Firm* — Alleman Hall McCoy Russell & Tuttle LLP

(57) ABSTRACT

A method is provided for reducing degradation in a fuel cell assembly, including at least one fuel cell with a PBI membrane, during standby, operation. The method may include electrochemically consuming an oxidant from a cathode coupled to the PBI membrane in response to a disconnection of an external load and supplying fuel to remove or electrochemically consume any back-diffused oxidant to the associated fuel cell sufficient to replace or consume the back-diffused oxidant while the external load is removed, and/or also may include controlling a standby temperature of the fuel cell. In this way, it may be possible to avoid increased cell voltage decay associated with degradation of the PBI in a simple and cost effective system.

10 Claims, 4 Drawing Sheets

U.S. PATENT DOCUMENTS

| | | |
|---|---|---|
| 2006/0134509 A1 | 6/2006 | Ping et al. |
| 2006/0154133 A1 | 7/2006 | Song et al. |
| 2006/0154134 A1 | 7/2006 | Vinsant |
| 2006/0204828 A1 | 9/2006 | Petrovic et al. |
| 2007/0055045 A1 | 3/2007 | Kiefer et al. |
| 2007/0059583 A1 | 3/2007 | Vinsant |
| 2007/0065709 A1 | 3/2007 | Petrovic et al. |
| 2008/0026263 A1* | 1/2008 | Leboe et al. .................... 429/13 |

OTHER PUBLICATIONS

Meyers, Jeremy P. et al., "Model of Carbon Corrosion in PEM Fuel Cells," Journal of the Electrochemical Society, Jun. 5, 2006, A1432-A1442, 153 (8), The Electrochemical Society, Inc., South Windsor, Connecticut.

ISA/KR, International Search Report of PCT/US2008/083784, Mar. 31, 2009, Korea.

* cited by examiner

SYSTEM AND METHOD FOR OPERATING A HIGH TEMPERATURE FUEL CELL AS A BACK-UP POWER SUPPLY WITH REDUCED PERFORMANCE DECAY

BACKGROUND

Systems that integrate fuel cells with improved high temperature performance can offer advantages as back-up power applications. For example, fuel cell systems using a polybenzimidazole (PBI) membrane can operate at higher levels of carbon monoxide, without auxiliary systems for product water management, reactant gas humidification, and simpler heat management.

In back-up power applications, immediate power delivery from the fuel cell system can be facilitated in PBI membrane based fuel cell systems by maintaining the fuel cells in a standby mode near the nominal operating temperature range for these types of fuel cells. However, extended durations in standby mode can dramatically reduce performance and life of the fuel cells.

SUMMARY

The inventors have recognized that performance decay of the fuel cells can result from deteriorations in the PBI membrane under some conditions present during a non-operating standby mode. In one embodiment, a method is provided for reducing degradation in a fuel cell assembly, including at least one fuel cell, during such mode. The method may include creation of an inert environment in the fuel cell by consuming residual oxidant from a cathode coupled to the PBI membrane entering into standby mode in response to a disconnection of an external load, and supplying fuel to the anode electrode to electrochemically consume any back-diffused oxidant to the fuel cell while the external load is removed. The degradation is further reduced if the fuel cell temperature is reduced in this state to below the normal operating temperature for nominal power generation. In this way, it may be possible to avoid or reduce conditions during standby mode that can lead to increased cell voltage and corresponding degradation with a simple and cost effective system.

DETAILED DESCRIPTION OF EXAMPLE EMBODIMENT(S)

Figure 1:
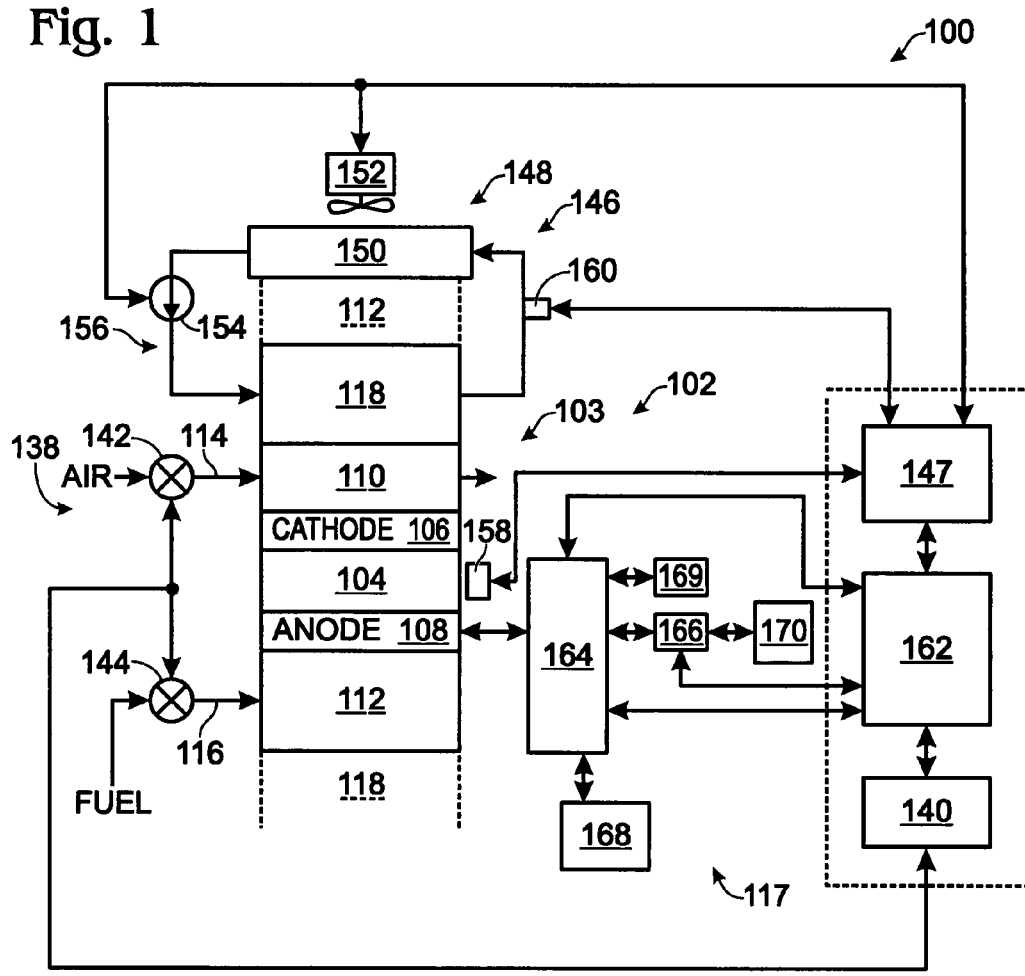
FIG. 1 is a schematic illustration of an embodiment of a back-up power supply system including a fuel cell system and various auxiliary components of the fuel cell system.

FIG. 1 shows a schematic illustration of a fuel cell system 100. Fuel cell system 100 includes a fuel cell assembly 102. In general, the fuel cell assembly 102 may be configured to generate power from a reaction between a supplied fuel and oxidant for driving an external load. The fuel cell assembly 102 may include at least one fuel cell 103. In some embodiments, the fuel cell assembly 102 may include a plurality of fuel cells that may be electrically connected to generate a higher voltage. For example, the fuel cell assembly 102 may include a fuel cell stack including a plurality of fuel cells electrically connected in series. It may be appreciated that the embodiment illustrated in FIG. 1 shows the components of one fuel cell although the fuel cell assembly includes a plurality of fuel cells connected to fuel cell 103 in series at the dashed lines.

The fuel cell 103 includes an electrolyte 104 disposed between a cathode electrode 106 and an anode electrode 108. The cathode and anode electrodes may include gas diffusion layers configured to distribute oxidants to the cathode electrode 106 and fuel to the anode electrode 108. When fuel is supplied to the fuel cell 103, a voltage is generated across the cell by reactions at the cathode electrode 106 and the anode electrode 108. As such, the fuel cell 103 may include a cathode flow field plate 110 configured to direct an oxidant supplied via a cathode inlet 114 to the cathode electrode 106. Similarly, an anode flow field plate 112 may be configured to direct a fuel supplied via an anode inlet 116 to the anode electrode 108. Further, a separator plate 118 may be disposed between the anode and cathode flow field plates between two adjacent fuel cells in a fuel cell stack. The separator plate 118 may be adapted to direct a flow of heat exchange fluid to control a temperature of the fuel cell assembly through an internal flow path within the separator plate 118. In operation of the fuel cell, the separator plate 118 may also facilitate electron transport between the anode flow field 112 of one fuel cell and the cathode flow field 110 in another fuel cell in a fuel cell stack.

Continuing, the electrolyte 104 transports ions between the cathode electrode 106 and anode electrode 108, As such, the electrolyte 104 may include various suitable material or materials, depending upon the chemistry of a specific fuel cell. Suitable materials for an electrolyte include materials that exhibit high ion conductivity, low gas permeability, high mechanical stability, high chemical stability, and high thermal stability.

In some embodiments, the fuel cell is a proton exchange membrane (PEM) fuel cell. In such fuel cells, the electrolyte 104 may include a proton-conducting material configured to transport protons generated at the anode. Some PEM fuel cells may utilize an electrolyte 104 that is operable at higher temperatures. Such an electrolyte 104 may include a polymer adapted to increase anhydrous ion transfer at higher temperatures while reducing gas permeability. Specifically, a solid polymer with improved permeability properties doped with a liquid electrolyte may be operable at higher temperatures with reduced gas permeability. In one example, a polybenzimidazole (PBI) membrane may be doped with a strong oxoacid, such as phosphoric acid and/or sulphuric acid, to increase proton conductivity. The PBI membrane doped with a concentration of aqueous phosphoric acid (as referred to hereinafter as "the PBI membrane") may be operable approximately between 160 and 180 degrees Celsius.

Fuel is oxidized at the anode electrode 108, thereby producing electrons and protons. For example, hydrogen gas supplied to the anode electrode 108 may be ionized, producing electrons ($e^-$) and protons ($H^+$) according to the following reaction:

$$2H_2 \rightarrow 4H^+ + 4e-$$ 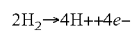

The hydrogen ions (H+) travel through the electrolyte 104 to the cathode electrode 106. Electrons generated at the anode electrode 108 travel through the external circuit 117 and pass through the separator plate 118 and the cathode flow field 110 to the cathode 106. Supplied oxidant may react with the electrons (e−) and the hydrogen ions (H+) at the cathode electrode 106 according to the following reaction:

$$O_2 + 4e^- + 4H^+ \rightarrow 2H_2O$$

A reactant delivery system 138 may regulate the supply of the fuel and the oxidant to the fuel cell assembly 102. The reactant delivery system 138 may include a reactant delivery controller 140, an oxidant valve 142 for regulating a supply of an oxidant to the fuel cell assembly 102, and a fuel valve 144 for regulating a supply of a fuel to the fuel cell assembly 102. In some embodiments, the oxidant may include oxygen from cylinder and/or compressed air. As such, the reactant delivery system 138 may include an air pump (not shown) to supply air through the oxidant valve to the cathode manifold. It will be understood that the depicted reactant delivery system 138 is shown for the purpose of example, and that any other suitable component or components may be utilized to supply the reactants to the fuel cell assembly 102.

The reactant delivery controller 140 may prompt the oxidant valve 142 to selectively open to deliver an amount of oxidant to the cathode electrode 106 of the fuel cell assembly 102. Similarly, the reactant delivery controller 140 may prompt the fuel valve 144 to deliver an amount of fuel to the anode electrode 108 of the fuel cell assembly 102.

The fuel cell system 100 may include a heat control system 146 to regulate the temperature of the fuel cell assembly 102. The heat control system 146 may include a heat controller 147, a heat exchanger 148 including a heat exchange element 150, a fan 152, and a pump 154 for controlling the temperature of a heat transfer fluid through a cooling loop 156. The cooling loop 156 may direct the cooling fluid through the separator plate 118, and/or through any other suitable portions of the fuel cell assembly 102 and/or the fuel cell system 100 to facilitate temperature control. The heat controller 147 may operate the fan 152 and the pump 154 to vary a level of heat exchange between the heat exchange element 150 and the cooling fluid at the heat exchanger 148. For example, the heat controller 147 may selectively activate the fan 152 to control the temperature of the cooling fluid and adjust the flow of the cooling fluid through the cooling loop 156 so as to control the temperature of the fuel cell assembly 102. As such, the heat control system 146 may further include a fuel cell temperature sensor 158 and a cooling loop sensor 160 configured to determine the temperature of the fuel cell assembly and the cooling fluid through the cooling loop 156.

Power generated by the fuel cell assembly 102 may be supplied to the external circuit 117. The external circuit 117 may include a power distribution element 164 for regulating power transfer between the fuel cell assembly 102 and various other components of the external circuit 117. In particular, the power distribution element 164 may include a plurality of switches configured to selectively connect the fuel cell assembly 102, a power conditioner 166 for a load application 170, a battery 168, an internal load 169, various other suitable components, or some combination thereof, based on instructions from the processor 162 and/or corresponding manual switches. In one example, the internal load 169 may be an electrical resistive load.

The power distribution element 164 may be operable based on instructions from a processor 162. During operation of the fuel cell system 100, a power demand of the load application 170 may be communicated to the processor. As such, the power distribution element 164 may be configured to deliver power from the fuel cell assembly 102 to the load application 170 via the power conditioner 166. Specifically, the power distribution element 164 may activate a switch to electrically communicate the fuel cell assembly 102 to the power conditioner 166 and the load application 170 so as to deliver power to the load application 170. The power conditioner 166 may convert the direct current from the fuel cell assembly 102 to an alternating current for supply to the load application 170 (e.g. a power grid, etc.) based on a power demand of the load application 170. Alternately or in addition, the battery 168 may be operable to supply power to the load application 170. For example, during start-up of the fuel cell system 100, the battery 168 may supply at least a portion of the power to the load application 170 until the fuel cell assembly 102 commences generating power commensurate with the power demand of the load application 170.

The fuel cell system 100 may be operated in various modes. A first mode may include delivering power from a fuel cell assembly to the load application 170 commensurate with a power demand of the load application 170. Such operation may be referred to as "the power delivery mode." In this mode, the reactant delivery controller 140 may operate the reactant delivery system 138 to deliver fuel and oxidant to the fuel cell assembly 102 commensurate with a power demand from the external circuit 117.

A second mode may include a standby mode in which the fuel cell system 100 does not deliver power, but in which the fuel cell stack is kept in a state such that it would be able to go on load and deliver 100% power in a short period of time.

A third mode may include a shut-down mode in which the fuel cell system 100 is completely shut-down, and the fuel supply, temperature management, etc., are disabled.

It may be appreciated that the processor 162 may include instructions executable to operate the reactant delivery controller 140 and the heat controller 147 as well as the power distribution element 164 in accordance with an operation of the fuel cell assembly 102 in the various modes. In one example, the processor 162 may constitute a controller for controlling fuel cell operation. Operation of the fuel cell system 100 in some of these modes may result in degradations in the fuel cell 103. In one particular embodiment, performance of the fuel cell 103 may decay during operation in a standby mode as a result of degradations in a PBI membrane included in the electrolyte 104, as demonstrated below.

Figure 2:
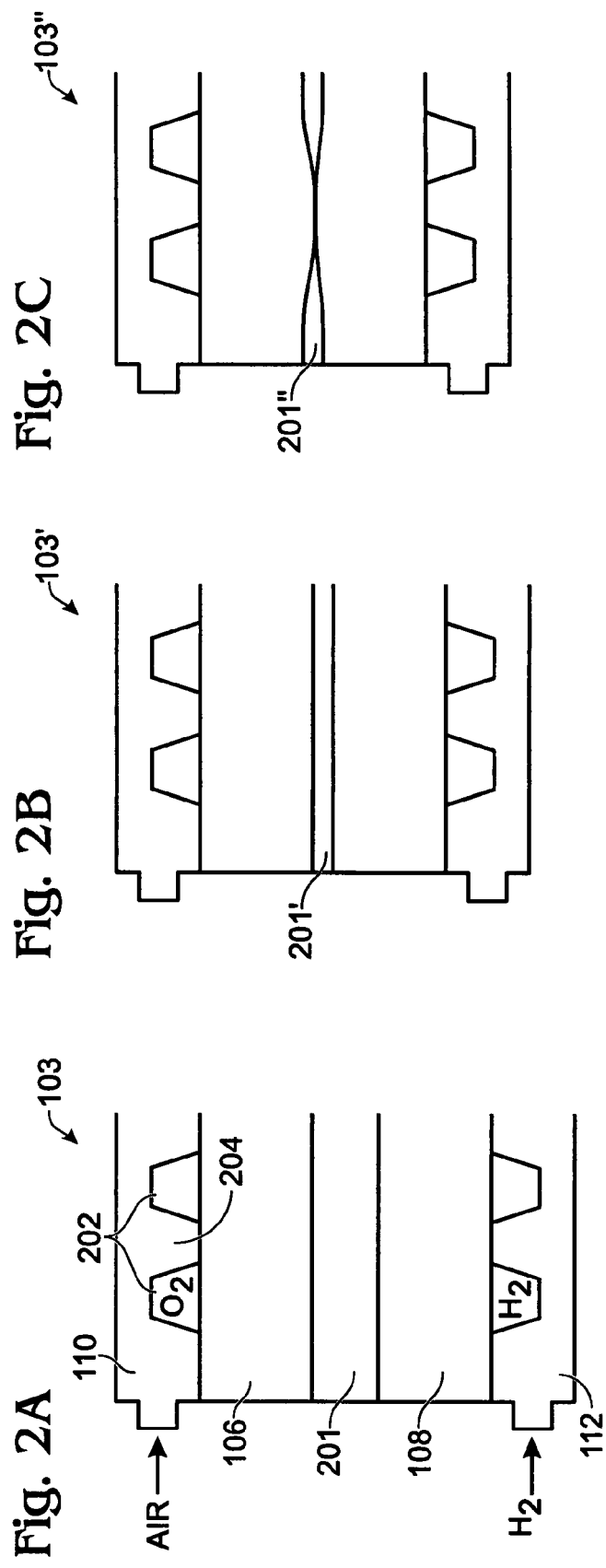
FIG. 2 shows an embodiment of a fuel cell including a polybenzimidazole (PBI) membrane at various stages of degradation.

Referring now to FIG. 2, additional detail of an exemplary fuel cell including various fuel cell components and materials that may be used as fuel cell 103 is illustrated. In the embodiment described herein, the electrolyte 104 of the fuel cell 103 includes a PBI membrane, as described above. In addition, FIG. 2 schematically illustrates an exemplary degradation process of the PBI membrane in the fuel cell 103 as a result of operation in a standby mode. FIG. 2A shows the fuel cell 103 prior to degradation. FIG. 2B shows the fuel cell 103 after the PBI membrane exhibits some degradation, and FIG. 2C shows the fuel cell 103 after the PBI membrane exhibits severe degradation. The degradation process described below schematically illustrates a typical degradation process and described the conditions present during a standby mode that may facilitate such a degradation process for a PBI membrane fuel cell.

Turning first to FIG. 2A, the fuel cell 103 as shown prior to degradation includes a PBI membrane 201 as the electrolyte 104 disposed between the cathode electrode 106 and the anode electrode 108. In addition, the cathode electrode 106 may include a gas diffusion layer configured to distribute oxidants, such as air, directed to the cathode electrode 106 via flow channels 202 of the cathode flow field plate 110 and to transport electrons between ionic species in the electrolyte 104 and contact posts 204 of the cathode flow field plate 110.

Similarly, the anode electrode 108 may also include a gas diffusion layer configured to distribute fuel 108 and transport electrons.

In one embodiment, the fuel cell system 100 including the fuel cell 103 described above may be used in back-up power applications where the fuel cell operates between approximately 160 to 180 degrees Celsius in response to the power system line voltage and/or current falling below desired levels. For back-up power applications where the system may remain primarily in a standby mode, the stacks may be maintained warm or near its operating temperature (e.g. at approximately 120 degrees Celsius or higher) to facilitate on load demands of full power delivery within short periods of time. However, maintaining the fuel cell assembly 102 in a standby mode for an extended period of time may result in membrane degradation of the fuel cell system 100.

The inventors have recognized that performance decay of the fuel cells can result from deteriorations in the PBI membrane including reduced mechanical integrity of the PBI membrane 201 under these conditions present when operating the fuel cell system 100 in a standby mode. The PBI membrane 201 shown in FIG. 2A schematically illustrates an exemplary embodiment of the fuel cell 300 including the PBI membrane 201 prior to degradation as a result of operation in a standby mode. In contrast, FIG. 2B and FIG. 2C illustrate exemplary embodiments of the PBI membrane at a degraded state and a fully degraded state with reduced mechanical integrity following extended stay in standby mode.

As such, a method for reducing such degradations in the PBI membrane is provided to reduce or avoid conditions during standby mode that cause reduced mechanical integrity of the PBI membrane.

FIG. 2B illustrates the fuel cell after operation in standby mode. The fuel cell 103 of FIG. 2A may be degraded as indicated in FIG. 2B by degraded fuel cell 103'. In particular, degraded fuel cell 103' includes PBI membrane 201 with reduced mechanical integrity as indicated by degraded PBI membrane 201' as a result of operation in standby mode.

In one aspect of degradation of the PBI membrane, reduced mechanical integrity may result from PBI instability under a PBI 'cleaving' environment. Specifically, the fuel cell at higher temperature and higher potential may cleave PBI polymer chains to reduce its molecular weight causing the PBI-PA membrane to change from a form of gel to a liquid solution. Such conditions may be present during non-power generation or standby mode because the fuel cell potential increases when power delivery from the fuel cell assembly 102 is discontinued. During power delivery operation, current flow from the fuel cell tries to increase the anode potential and decreases the cathode potential resulting in reduced fuel cell voltage. In contrast, under non-operating mode the fuel cell can achieve higher voltages known as Open Circuit Voltage (OCV), which may cause the PBI membrane to become liquefied. The liquefied membrane may then soak into the gas diffusion layers and/or the flow channels of the flow field plates. As a result, the thickness of the degraded PBI membrane 201' may be substantially thinner, as shown in FIG. 2B, after extended stay in the standby mode resulting in performance decay from increased gas permeability, as one example.

In another aspect of degradation, the mechanical integrity of the PBI membrane may result from the evaporation of water from the phosphoric acid from the PBI membrane. In particular, the phosphoric acid dehydrates at higher temperatures causing an increase of the concentration of the phosphoric acid in the PBI membrane and form pyrophosphoric and polyphosphoric acid. The solubility of PBI increases as the concentration of phosphoric acid increases and further increases under higher temperatures. As a result of the reduced mechanical integrity, the PBI membrane may be pressed into the gas diffusion layers in the anode and cathode electrodes under compression of the fuel cell, again resulting in thinning of the PBI membrane The above degradations related to the PBI membrane structure may result in excessive thinning, causing permanent degradation of the fuel cell system. Specifically, thinning of the PBI membrane may occur to a degree causing the fuel cell system to be substantially inoperable. FIG. 2C illustrates the fuel cell after excessive thinning resulting in "shorting" of the anode and the cathode electrodes. The fuel cell 103 of FIG. 2B may be fully degraded as indicated by fully degraded fuel cell 103" and, as such, may include the PBI membrane in a fully degraded state as indicated by fully degraded PBI membrane 201".

The term "shorting" of the fuel cell may hereinafter refer to degradation of the electrolyte between the anode and the cathode electrodes resulting in physically touching of the anode and cathode electrode causing an unintended internal path for electrical current between these components.

Permanent degradation of the system may result from shorting of the fuel cell through a fully degraded PBI membrane 201". Fully degraded fuel cell 201" may not hold a voltage for power delivery. Additional data illustrating the catastrophic effects of such degradation are provided below herein with regard to FIG. 4. Further, such degradation may also be affected by standby temperature, also illustrated below herein with regard to FIG. 5.

Figure 3:
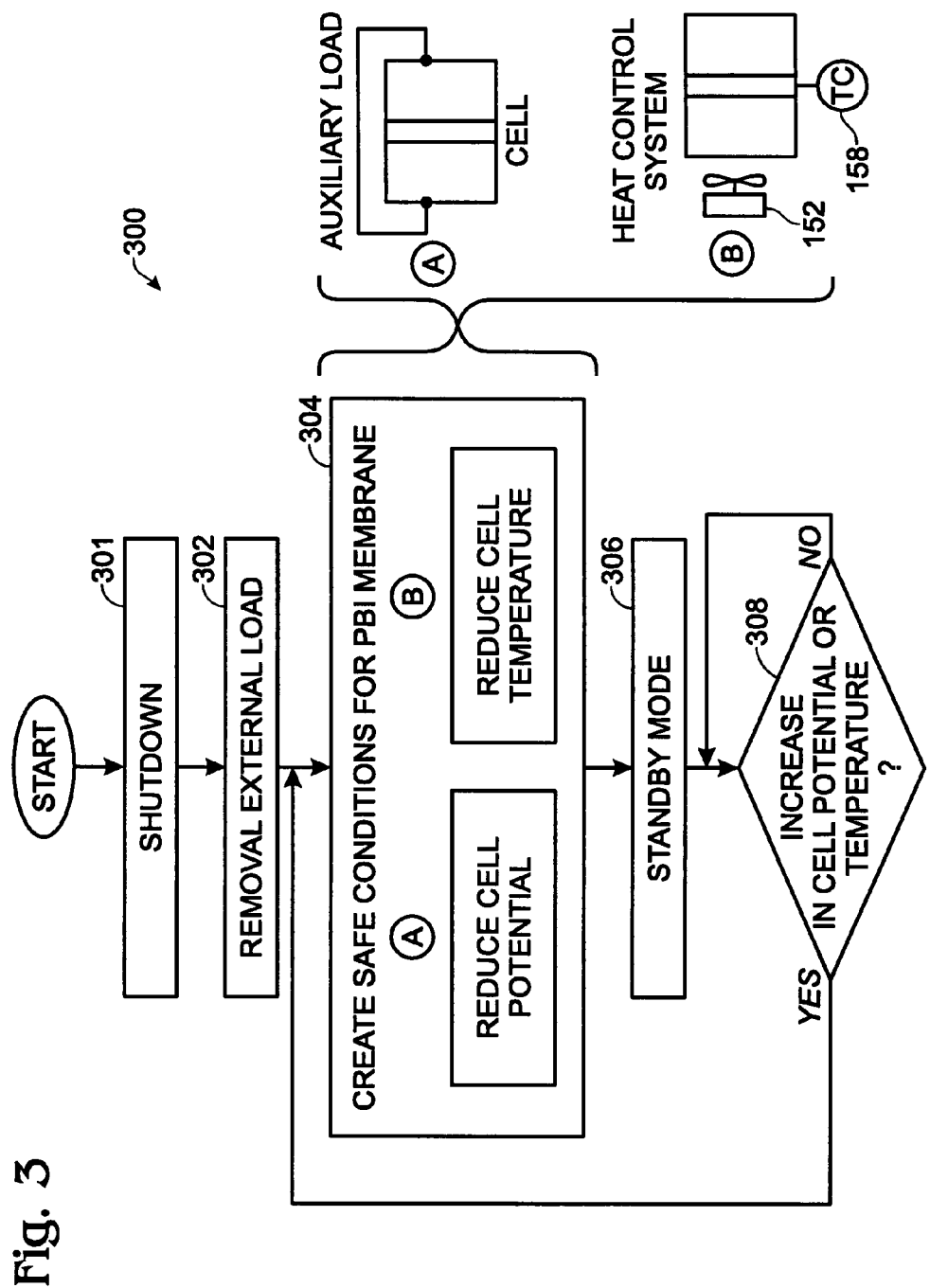
FIG. 3 shows a high level flow chart depicted an embodiment of a method for operating a fuel cell including a PBI membrane to reduce performance decay.

Referring now to FIG. 3, a high level flowchart is shown that describes operation of the fuel cell 103 by the processor 162 during a transition out of power delivery or generation mode into a standby mode, where a combination of coordinated temperature management, cell voltage management, and reactant supply management is used. The approach may avoid use of blanket of inert gasses, thus avoiding secondary gas supply and storage. In one specific example, a process is used where, during operation in the standby mode, oxidants are first depleted from the fuel cell cathode electrode by consuming the oxidant via an electrochemical process. Then, additional fuel may be supplied to the fuel cell to compensate for any back-diffusion of oxygen into the fuel cell. In this way, the above described degradation mechanisms of the PBI membrane may be avoided or reduced during extended exposure in the standby mode.

Referring now specifically to FIG. 3, method 300 is initiated at 301 when the processor 162 first detects a shutdown command. The processor may receive a shutdown signal in response to various situations. Under some conditions, operation of the fuel cell system in the power delivery mode may be at least temporarily interrupted. For example, the power demand from the load application may cease or when another source commences delivery of power to the load application. In another example, where the fuel cell system functions as a back-up power source, power required from the fuel cell assembly may cease or when a primary power source (such as an electrical grid) becomes operable following a failure causing the shutdown of the fuel cell system. In yet another example, the fuel cell assembly may be disconnected from the load application due to an emergency shutdown of the fuel cell system based, for example, on a maintenance recommendation triggered by a detected condition of the fuel cell system. Such conditions include without limitation an abnormal fuel flow, temperature condition, irregular voltage, etc.

Following a detected shutdown signal at 301, the external load is removed from the fuel cell assembly. The power distribution element may configure a switch to electrically disconnect the fuel cell assembly from the load application.

At this time, performance decay of the fuel cells may result from deteriorations in the PBI membrane as a result of the PBI instability and increased concentration of phosphoric acid under the higher temperature conditions and electrochemical potential present during standby. To mitigate these conditions and reduce thinning of the PBI membrane, method 300 includes at 304 measures for creating safe conditions for the PBI membrane as described below.

Continuing with FIG. 3, upon removing the external load, method 300 may include a process 304 for creating safe conditions for the PBI membrane. Specifically, process 304 may include:

A: First prevent exposure to high electrochemical potential. Reduction of the cell potential may be achieved in a number of ways. Higher potentials are generally present while oxidants remain within the fuel cell. Following removal of the external load, unconsumed oxidant from previous power generation mode may remain in the fuel cell. As such, one way to reduce the cell potential includes consuming reactants, such as oxidants, remaining in the fuel cell from previous power generation operation. Various electrochemical processes may be used to consume the oxidant, such as applying an internal load to the fuel cell (e.g., between the anode and cathode) to facilitate a reaction to consume the residual oxidant. Hydrogen or any other species that react with oxygen may also be supplied to the cathode electrode to consume the remaining oxidant. The other alternative may include use of an inert gas, like nitrogen, to displace residual oxygen from the fuel cell.

Method 300 may also include:

B: reducing temperature of the fuel cell system. Specifically, the heat control system may operate to prompt the fan 152 to cool the fuel cell assembly to a predetermined temperature as detected by the fuel cell temperature sensor 158.

In this way, the fuel cell system enters a standby mode, as shown at 306, with safe conditions for the PBI membrane. However, such safe conditions may be compromised if oxidant back-diffuses to the cathode and/or anode of the fuel cell resulting in increases in cell potential. Nevertheless, safe conditions may be maintained by monitoring the fuel cell for higher potentials and desired temperatures at 308 and applying the processes at 304 when the potential or temperature of the fuel cell increases outside of safe conditions for the PBI membrane. Specifically, if it is determined at 308 that the cell potential or temperature falls outside of safe conditions at, then the answer at 308 is yes, and method 300 returns to 304, and the system performs the processes described above. If no, method 300 continues to monitor for higher cell potentials and temperatures at 308.

In some embodiments, method 300 may determine higher potentials upon detecting voltages above a predetermined voltage. If the voltage of the fuel cell increases above a predetermined voltage, such as 0.4 V, the answer at 308 is yes, and method 300 returns to 304. As described herein, the voltage of the fuel cell may be detected and used to prompt the process for reducing potential. However, the process described at 304 may be prompted based on various other conditions, such as current through the internal load, pressure, a duration since the load removal, etc., that indicate cell potentials outside of safe conditions. In one embodiment, the method may comprise periodically adding a predetermined amount of hydrogen at predetermined time intervals where the predetermined time intervals may be based on experimentation and/or the models associated with an oxidant-consuming reaction. The fuel may be added continuously, intermittently, or in any other suitable manner. In one particular example, the method may trickle hydrogen flow into the anode to sustain a small current flow through the internal load. In these ways, the internal load may be used to equalize the cell, and further maintain the cell equilibrium while supplying the hydrogen used to compensate for the back-diffused oxidant.

Temperature control may include heat exchange to and from the fuel cell assembly to maintain safe temperature conditions within a desired temperature range. The temperature range may allow the PBI membrane to remain warm enough to rapidly enter power delivery mode from standby mode during a subsequent start-up of the fuel cell system while still maintaining safe conditions for the PBI membrane. In one embodiment, the temperature may be maintained, between 50-120 degrees C. During such temperature control, if the fuel cell is heated to a temperature above a predetermined temperature, the answer at 308 is yes, and method 300 returns top 304. At this time, temperature control may include prompting the fan 152 to cool the fuel cell assembly if the fuel cell temperature sensor 158 detects a temperature higher than a maximum temperature at 308 and turning the fan 152 off when a minimum temperature is detected.

Figure 4:
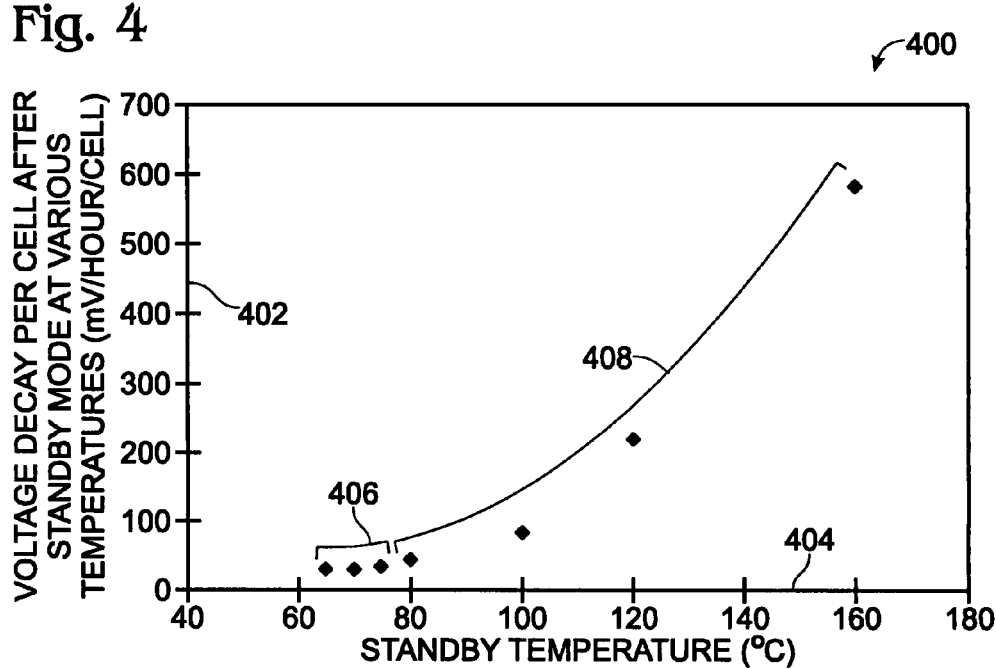
FIGS. 4-5 are graphs depicting data illustrating the effects of degradations in a PBI membrane on the performance of the fuel cell.

Referring now to FIG. 4, graph 400 demonstrates performance decay of a fuel cell including a PBI membrane during standby mode following a shutdown, without the compensation of FIG. 3. In particular, graph 400 shows a decay rate of the voltage of the fuel cell, as demonstrated at axis 402, at various standby temperatures, as shown at axis 404, for a given time in standby mode. As such, data for the fuel cell shown in graph 400 may include performance decay attributable to membrane degradations as described above. It may be understood that prophetic data 406 may be extrapolated from experimental data 408.

Figure 5:
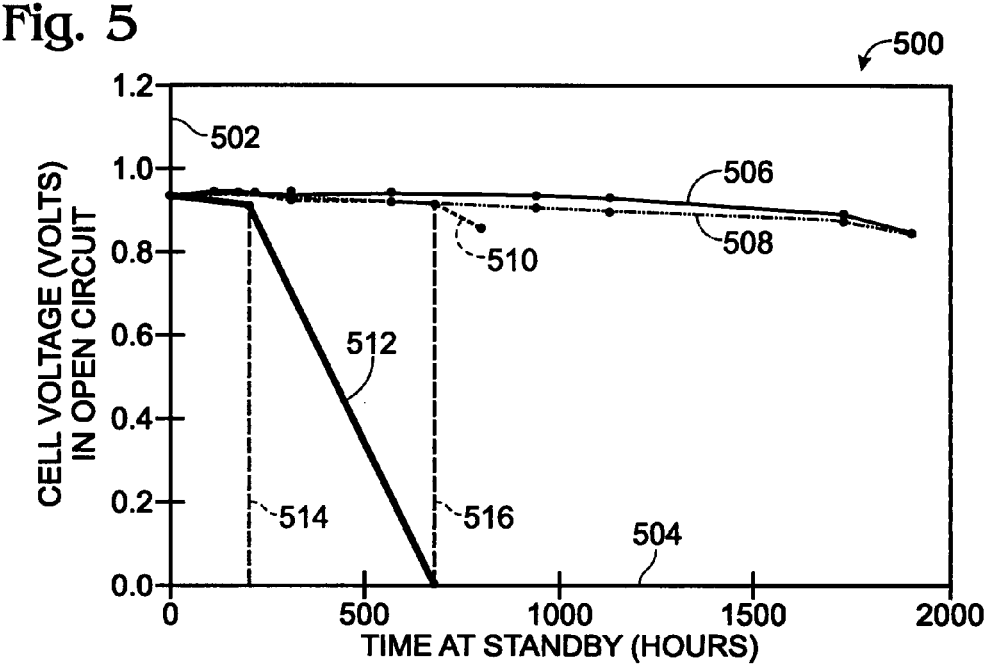

Referring now to FIG. 5, graph 500 demonstrates decay of an open circuit voltage for a fuel cell including a PBI membrane at various temperatures. In particular, graph 500 shows data of open circuit voltages of a fuel cell including the PBI membrane over time indicative of degradations and a gross failure of the PBI membrane.

In general, graph 500 demonstrates that increased decay of open circuit voltages (OCV) in a fuel cell including the PBI membrane may occur within reduced intervals of time when the fuel cell remains at open circuit voltage at increased temperatures. Graph 500 includes an axis for demonstrating a voltage of the cell at 502 and an axis for demonstrating a length of time that the fuel cell remains in standby mode during uncontrolled shutdown at 504. Specifically, graph 500 shows the open circuit voltage of the fuel cell over time at 80 degrees Celsius at data curve 506, at 100 degrees Celsius at data curve 508, at 120 degrees Celsius at data curve 510, and at 160 degrees Celsius at data curve 512.

Data curves 506, 508, and 510 may demonstrate increased rates of decay of the fuel cell open circuit voltage due to PBI membrane degradation. Specifically, a rapid drop in open circuit voltage as a result of failure in the mechanical integrity of the PBI membrane is not demonstrated in the data of curves 506, 508, and 510. For example, data curve 506 shows that open circuit voltages with relatively reduced decay may be demonstrated when the temperature of the fuel cell is approximately 80 degrees Celsius. Data curve 508 shows that open circuit voltages with slightly increased rates of decay relative to data curve 506 may be demonstrated when the temperature of the fuel cell is approximately 100 degrees Celsius; however, even at a temperature approximately corresponding to the boiling point of water, the open circuit voltage may still demonstrate relatively reduced decay. Data curve 510 may show further increased decay of open circuit voltages; however, a voltage may still be sustained during the interval of time shown.

Data curve 512 demonstrates gross failure of the PBI membrane resulting from one or more of the above aspects of degradation and as schematically illustrated in fully degraded PBI membrane 201" of FIG. 2C. As shown by the exemplary data curve at 512, gross failure of the PBI membrane may be understood to be associated with a rapid drop of an open circuit voltage. In particular, gross failure of the PBI membrane may generally be responsive to mechanical failure of the PBI membrane rather than various other degradations in the fuel cell. Such a rapid drop may result from electrical communication between the anode and the cathode as a result of excessive thinning of the PBI membrane. The rapid thinning of the PBI membrane may also result in substantial mixing of the reactants at the anode and cathode, such as through a void in the electrolyte, such that depolarization of the fuel cell may facilitate a rapid drop in voltage from the time of gross failure at dashed line 514 to the loss of voltage at dashed line 516. As such, degradation of the fuel cell described herein may experience such a failure as a result of reduced mechanical integrity of the membrane that may apply uniquely to an electrolyte including a PBI membrane.

Although the present disclosure includes specific embodiments, specific embodiments are not to be considered in a limiting sense, because numerous variations are possible. The subject matter of the present disclosure includes all novel and non-obvious combinations and subcombinations of the various elements, features, functions, and/or properties disclosed herein. The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A fuel cell system, comprising:
    at least one fuel cell with a polybenzimidazole (PBI) membrane doped in phosphoric acid having an anode and a cathode;
    a cooling fan;
    an external load;
    an internal load;
    a controller having a processor including instructions executable to disconnect the external load, connect the internal load to reduce voltage of the fuel cell to substantially zero, repeatedly supply hydrogen to the anode of the fuel cell commensurate with a reaction of back-diffused oxygen at the cathode, and reduce a temperature of the fuel cell to a predetermined temperature, where the predetermined temperature is lower than an operating temperature of the fuel cell.

2. The system of claim 1, where the processor further includes instructions executable to adjust fuel cell temperature via adjustment of the fan.

3. The system of claim 1 further comprising an oxidant supply, where the processor further includes instructions executable to discontinue oxidant supply during the connection of the internal load.

4. The system of claim 1 where the processor further includes instructions executable to disconnect the external load to enter a standby mode.

5. The system of claim 4 where the processor further includes instructions executable to repeatedly supply the hydrogen continuously.

6. The system of claim 4 where the processor further includes instructions executable to repeatedly supply the hydrogen intermittently.

7. The system of claim 1 wherein the processor further includes instructions executable to detect disconnection of the external load and transition the system from power generation to a standby mode, stop a supply of oxidant, connect the internal load in response to the detected external load disconnection, maintain connection of the internal load while repeatedly supplying hydrogen to the anode of the fuel cell, the processor further including instructions to supply the hydrogen commensurate with a reaction of back-diffused oxygen at the cathode, without supplying inert gasses during said maintenance of zero or near zero potential.

8. The system of claim 7 where the system is coupled in a back-up power generation system, where the processor further includes instructions executable to operate the fuel cell to provide back-up power in response to line voltage and/or current of a power system.

9. The system of claim 8 where the hydrogen is repeatedly supplied at a predetermined rate.

10. The system of claim 9 where the processor further includes instructions executable to detect the disconnection of the external load when a voltage of the fuel cell is greater than or equal to a threshold value.

* * * * *